United States Patent
Shen

(10) Patent No.: US 10,400,807 B2
(45) Date of Patent: Sep. 3, 2019

(54) TENON GROOVE CONNECTING STRUCTURE OF FRONT FRAME AND SIDE PANEL FOR CABINET

(71) Applicant: Kunshan Baiyulan Furniture Co., Ltd., KunShan (CN)

(72) Inventor: Zhongmin Shen, KunShan (CN)

(73) Assignee: KUNSHAN BAIYULAN FURNITURE CO., LTD., Kunshan (CN)

( * ) Notice: Subject to any disclaimer, the term of this patent is extended or adjusted under 35 U.S.C. 154(b) by 309 days.

(21) Appl. No.: 15/447,794

(22) Filed: Mar. 2, 2017

(65) Prior Publication Data
US 2018/0252248 A1  Sep. 6, 2018

(51) Int. Cl.
*F16B 12/12*  (2006.01)

(52) U.S. Cl.
CPC .... *F16B 12/125* (2013.01); *A47B 2230/0077* (2013.01)

(58) Field of Classification Search
CPC ........ F16B 12/125; F16B 12/20; F16B 12/24; E06B 3/96; E06B 3/984; A47B 13/003; A47B 13/04
See application file for complete search history.

(56) References Cited

U.S. PATENT DOCUMENTS

| | | | | |
|---|---|---|---|---|
| 3,664,011 A * | 5/1972 | Labastrou | ................. | B27F 1/00 144/347 |
| 4,042,307 A * | 8/1977 | Jarvis | ...................... | F16B 12/04 403/290 |
| 4,750,794 A * | 6/1988 | Vegh | .................... | A47B 47/042 312/195 |
| 4,845,901 A * | 7/1989 | Hamlin | .................. | B24D 15/02 451/523 |
| 5,899,251 A * | 5/1999 | Turner | ...................... | B27F 1/02 144/150 |
| 6,200,062 B1 * | 3/2001 | You | .......................... | F16B 12/20 403/381 |
| 6,413,007 B1 * | 7/2002 | Lambright | ........... | A47B 13/003 403/353 |
| 7,897,005 B2 * | 3/2011 | Knauseder | ................. | C09J 5/00 156/304.5 |
| 8,864,407 B1 * | 10/2014 | Sorum | .................... | F16B 5/008 403/381 |

\* cited by examiner

*Primary Examiner* — Daniel J Wiley
(74) *Attorney, Agent, or Firm* — Hemisphere Law, PLLC; Zhigang Ma

(57) ABSTRACT

A tenon groove connecting structure of a front frame and a side panel for a cabinet comprising a front frame and a side panel is disclosed. Wherein, a dovetail groove is formed in an inner edge of the front frame, shoulder grooves are formed in both sides of an opening part of the dovetail groove, and an inner part of the dovetail groove is shaped as inverted trapezoid, and a gap is reserved between at least one side face of the shoulder groove and a corresponding side face of the side panel, and the depth of each shoulder groove accounts for ⅕-½ of the depth of the dovetail groove and the width of the gap is 0.5 -2 mm.

1 Claim, 1 Drawing Sheet

TENON GROOVE CONNECTING STRUCTURE OF FRONT FRAME AND SIDE PANEL FOR CABINET

FIELD OF THE INVENTION

The present relates to a tenon groove connecting structure of a front frame and a side panel for a cabinet, the invention is mainly used for connecting a front frame and a side panel of an American-style cabinet.

BACKGROUND OF THE INVENTION

The connecting mode of the front frame and the side panel of the existing traditional American-style cabinet adopts a fastener that serves to join, which leads to forming a protruding part in the cabinet, space occupation, influence on use and poor connection strength.

SUMMARY OF THE INVENTION

The invention aims to provide a connecting structure of a front frame and side panel of an American-style cabinet, in order to solve the problems of forming a protruding part in the cabinet, space occupation, influence on use and poor connection strength for adopting a fastener that serves to join in the prior art.

According to the technical scheme, the tenon groove connecting structure of front frame and side panel for cabinet comprises a front frame and a side panel, the front frame is characterized in that a dovetail groove is formed in the inner edge of the front frame, shoulder grooves are formed in two sides of the opening part of the dovetail groove, and a gap is reserved between the side face of the shoulder groove in at least one side and the side face of the side panel.

Preferably, the depth of the shoulder groove accounts for ⅕-½ of the depth of the dovetail groove and the width of the gap is 0.5-2 mm.

The tenon groove connecting structure provided by the present invention has advantages as follows: the dovetail groove tenon structure adopted for connection is convenient to assemble, the space in the cabinet is not occupied, and the connection strength is greatly improved compared with the original structure; in addition, shoulder groove structures are arranged on both sides of the opening part of the dovetail groove, and the gap reserved between the side surface of the shoulder groove on at least one side and the side surface of the side panel is easier to glue, thus a gap is not generated at the connection part.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
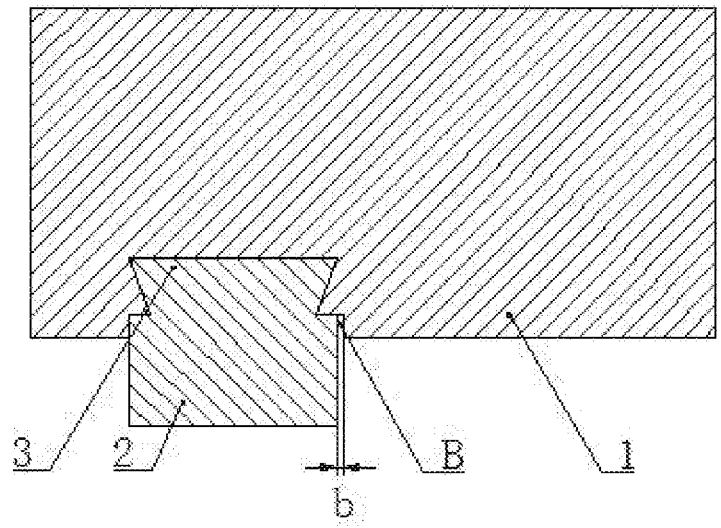
FIG. 1 is a sectional view of a junction of a front frame and a side panel according to the present invention.
Figure 2:
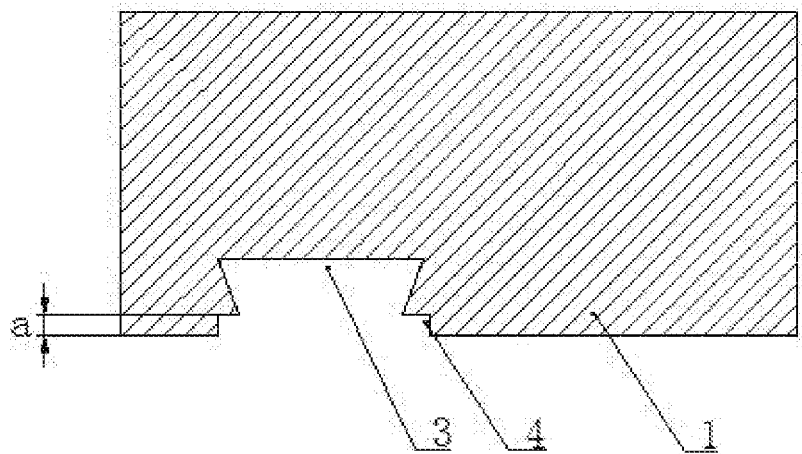
FIG. 2 is a sectional view of an embedded groove of the front frame of FIG. 1.

Referring to FIG. 1 and FIG. 2, the invention discloses a tenon groove connecting structure of a front frame and a side panel for a cabinet, which comprises a front frame 1 and a side panel 2. Wherein a dovetail groove 3 is formed in the inner edge of the front frame 1, shoulder grooves 4 are formed in both sides of the opening part of the dovetail groove 3, and a gap B is reserved between the side face of the shoulder groove 4 in at least one side (the side that faces to the outer side of the cabinet body) and the side face of the side panel 2.

The depth a of the shoulder groove 4 accounts for ⅕-½ of the depth of the dovetail groove ; the width b of the gap B is 0.5-2 mm.

As the tenon groove connecting structure of front frame and side panel for cabinet of the invention has shoulder grooves in both sides of the opening part of the dovetail groove, thus the opening part of the groove is widened, and the bonding agent is more easily adhered to the opening part of the groove; in addition, the gap on one side of the side panel can contain the extruded adhesive, accumulation is not easily generated at the gap when the finishing coat is coated, and cracks are avoided after curing.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A tenon groove connecting structure of front frame and side panel for cabinet comprising a front frame and a side panel, the front frame being characterized in that a dovetail groove is formed in an inner edge of the front frame, shoulder grooves are formed in both sides of an opening part of the dovetail groove, and an inner part of the dovetail groove is shaped as inverted trapezoid, and a gap is reserved between at least one side face of the shoulder groove and a corresponding side face of the side panel, and the depth of each shoulder groove accounts for ⅕-½ of the depth of the dovetail groove and the width of the gap is 0.5-2 mm.

* * * * *